(12) United States Patent
Sarkar et al.

(10) Patent No.: US 9,144,080 B2
(45) Date of Patent: Sep. 22, 2015

(54) SELECTING TRANSMISSION PARAMETERS FOR DOWNLINK TRANSMISSIONS BASED ON RETRANSMISSION RATES

(71) Applicant: Telefonaktiebolaget L M Ericsson (publ), Stockholm (SE)

(72) Inventors: Debasish Sarkar, Irvine, CA (US); Manoj Shetty, Mumbai (IN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 204 days.

(21) Appl. No.: 13/670,660

(22) Filed: Nov. 7, 2012

(65) Prior Publication Data

US 2014/0126359 A1    May 8, 2014

(51) Int. Cl.
*H04W 72/08* (2009.01)
*H04W 72/04* (2009.01)
*H04L 1/18* (2006.01)
*H04L 1/00* (2006.01)

(52) U.S. Cl.
CPC ........... *H04W 72/087* (2013.01); *H04L 1/1896* (2013.01); *H04W 72/0486* (2013.01); *H04W 72/08* (2013.01); *H04L 1/0003* (2013.01); *H04L 1/0009* (2013.01); *H04L 1/0026* (2013.01); *H04L 2001/0093* (2013.01); *H04W 72/04* (2013.01)

(58) Field of Classification Search
USPC .......... 370/328, 329, 252, 332; 455/561, 450, 455/509, 452.2
See application file for complete search history.

(56) References Cited

U.S. PATENT DOCUMENTS

| 7,257,423 | B2 * | 8/2007 | Iochi .............................. 455/561 |
| 2005/0181811 | A1 | 8/2005 | Magnusson et al. |
| 2010/0067396 | A1 * | 3/2010 | Cui et al. ....................... 370/252 |
| 2010/0124887 | A1 * | 5/2010 | Wellington ..................... 455/69 |
| 2010/0227606 | A1 * | 9/2010 | Nan et al. ................... 455/422.1 |
| 2010/0246469 | A1 * | 9/2010 | Gheorghiu et al. ........... 370/312 |
| 2010/0265862 | A1 * | 10/2010 | Choi et al. ..................... 370/311 |
| 2011/0103335 | A1 * | 5/2011 | Golitschek Edler von Elbwart et al. .............................. 370/329 |
| 2011/0305213 | A1 * | 12/2011 | Lohr et al. ..................... 370/329 |
| 2013/0107782 | A1 * | 5/2013 | Anas et al. .................... 370/311 |

FOREIGN PATENT DOCUMENTS

| EP | 2019559 A1 | 1/2009 |
| WO | 2009158545 A2 | 12/2009 |
| WO | 2010033704 A2 | 3/2010 |

\* cited by examiner

*Primary Examiner* — Habte Mered
*Assistant Examiner* — Rownak Islam
(74) *Attorney, Agent, or Firm* — Coats & Bonnett, PLLC

(57) ABSTRACT

A supporting node maintains a retransmission database that stores information about the historical retransmission rates of user terminals served by the network. The supporting network node provides the information about the retransmission rates of the user terminals to the base stations that are serving the user terminals. When a user terminal is being scheduled to receive a downlink transmission, the scheduler at the base station may use historical retransmission rates of the user terminal to select transmission parameters, e.g. modulation and coding scheme (MCS) and/or transport block size (TBS), for the downlink transmission.

18 Claims, 9 Drawing Sheets

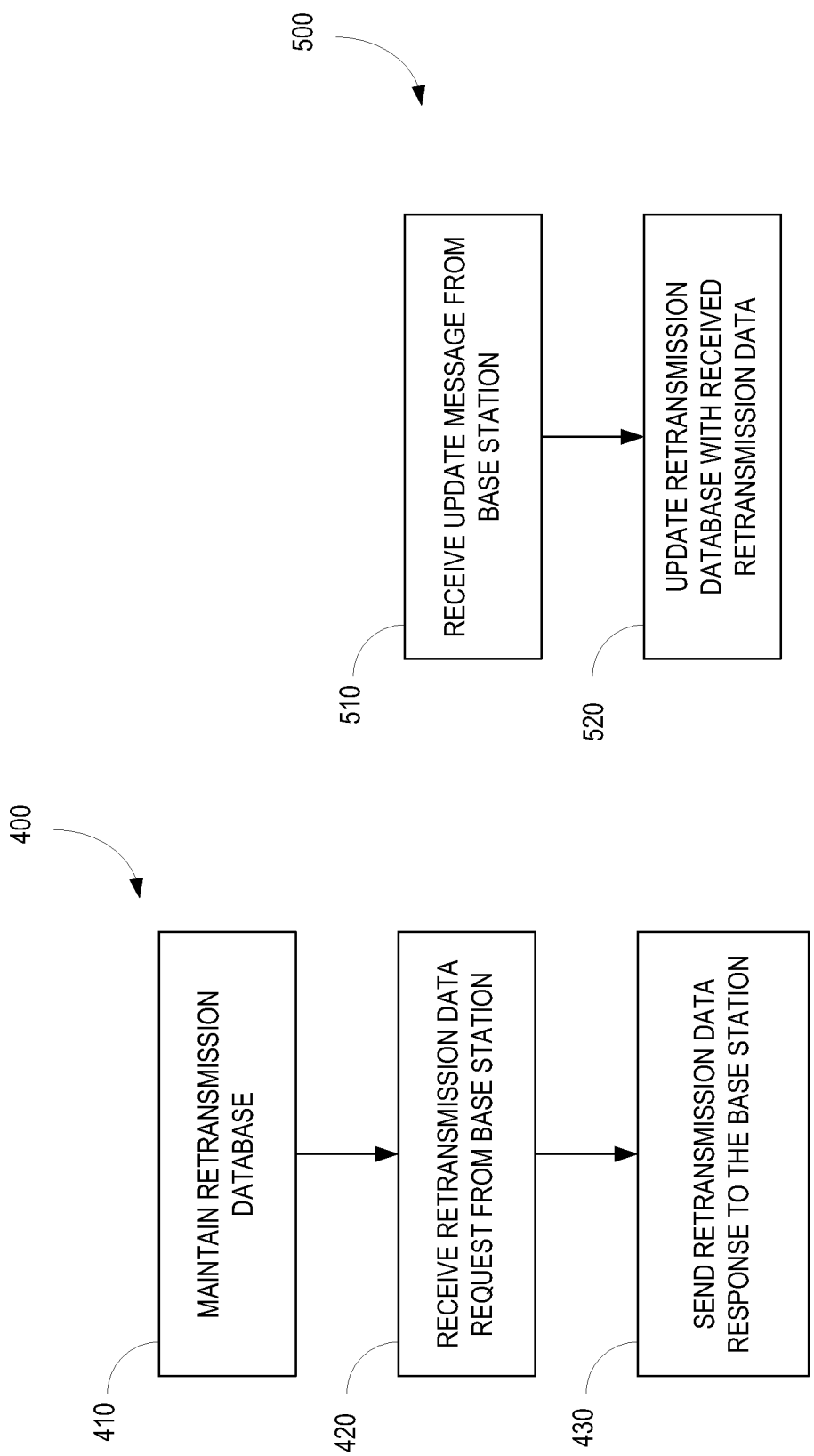

SELECTING TRANSMISSION PARAMETERS FOR DOWNLINK TRANSMISSIONS BASED ON RETRANSMISSION RATES

TECHNICAL FIELD

The present invention relates generally to the scheduling of downlink transmissions from a base station to a user terminal in a wireless communication network and, more particularly, to the adaptation of scheduling algorithms based on retransmission rates of the user terminal being scheduled.

BACKGROUND

In some wireless communication systems, such as, for example, the Long Term Evolution (LTE) system, the physical channels are shared among a plurality of users. Examples of shared channels in the LTE system are the Physical Downlink Shared Channel (PDSCH) and the Physical Uplink Shared Channel (PUSCH). Fast scheduling is used to ensure efficient resource usage. A scheduler at the base station schedules users and assigns resources on the shared channel based on factors such as the amount of data to be transmitted, quality of service (QoS) requirements, and instantaneous channel conditions.

To facilitate scheduling on the PDSCH, user terminals send channel quality indication (CQI) reports to the base station. The CQI reports indicate the instantaneous channel conditions as seen by the receiver at the user terminals. The base station uses the CQI reports to determine which user terminals to schedule to receive downlink transmissions in a particular scheduling interval. The base station also uses the CQI reports to select the modulation and coding scheme (MCS) and transport block size (TBS) for the downlink transmissions to a user terminal.

The implementation of CQI reporting is not defined in the LTE standard and is therefore dependent on vendor implementation. It has been observed that some variation exists in the CQIs reported by different user terminals under similar conditions. Some vendors may choose to configure user terminals to report CQI values higher than the actual CQI so that the scheduler at the base station will assign a higher TBS to the user terminal and thus obtain higher throughput for that user terminal. However, reporting CQI values higher than actual CQI will result in higher retransmission rates and lower system throughput. Similarly, non-calibrated handsets, i.e., rogue handsets, may also report CQI values higher than actual CQI with the same result.

SUMMARY

According to particular embodiments of the present invention methods and apparatuses are provided for selecting transmission parameters for user terminals that consistently report overly high CQI values. A supporting node maintains a retransmission database that stores information about the historical retransmission rates of user terminals served by the network. The supporting network node provides the information about the retransmission rates to the base stations that are serving the user terminals. When a user terminal is being scheduled to receive a downlink transmission, the scheduler at the base station may use historical retransmission rates of the user terminal to select transmission parameters, e.g. MCS and/or TBS, for the downlink transmission. In one exemplary embodiment, the selection of a TBS is biased to the low end of a range of TBS value for user terminals that consistently report overly high CQI values, and thus have higher than normal retransmission rates.

Exemplary embodiments of the invention comprise methods implemented by a base station in a wireless communication network of scheduling a downlink transmission to a user terminal. The base station receives a channel quality indication from the user terminal indicative of the channel condition between the base station and the user terminal. The base station also determines a retransmission rate for the user terminal. Based at least in part on the channel quality indication and the retransmission rate, the base station selectively determines a transmission parameter for scheduling the transmission, and sends a scheduling grant containing the transmission parameter to the user terminal.

Other embodiments of the invention comprise a base station in a wireless communication network. In one exemplary embodiment, the base station comprises a transceiver circuit for communicating with a user terminal, and a processor operatively connected to said transceiver circuit for scheduling a downlink transmission to the user terminal. The processor comprises a scheduler configured to receive a channel quality indication from the user terminal indicative of the channel condition between the base station and the user terminal, determine a retransmission rate for the user terminal; selectively determine a transmission parameter for scheduling the downlink transmission based at least in part on the channel quality indication and the retransmission rate, and send a scheduling grant containing the transmission parameter to the user terminal.

Other embodiments of the invention comprise methods implemented by a supporting network node in a wireless communication network in support of a scheduler at a base station. One exemplary method comprises maintaining a retransmission database including retransmission data for a plurality of user terminals; receiving a retransmission data request from a base station, said retransmission data request identifying a particular user terminal; and sending, responsive to said retransmission data request, a retransmission data response to said base station, said retransmission data response including retransmission data for said user terminal identified in said retransmission data request.

Other embodiments of the invention comprise a supporting network node in a wireless communication network. In one embodiment, the supporting network node comprises a network interface for communicating with a plurality of base stations in a wireless communication network, and a processor operatively connected to said network interface. The processor is configured to maintain a retransmission database containing retransmission rates for user terminals served by one or more base stations in the wireless communication network; receive a retransmission data request from one of the base stations, said retransmission data request identifying a particular user terminal; and send, responsive to said retransmission data request, a retransmission data response to said base station, said retransmission data response including retransmission data for said user terminal identified in said retransmission data request.

Particular embodiments of the present invention may reduce the number of retransmissions due to overly optimistic CQI reporting by user terminals. Fewer retransmissions, in turn, increases the system throughput since fewer resources will be used for retransmissions.

Of course, the present invention is not limited to the above features and advantages. Indeed, those skilled in the art will

BRIEF DESCRIPTION OF THE DRAWINGS

FIG. 7 illustrates an exemplary method implemented by a supporting network node of providing retransmission rates to the base stations in a wireless communication network.

FIG. 8 illustrates an exemplary method implemented by a supporting network node of updating a retransmission database containing retransmission rates for user terminals served by a wireless communication network.

DETAILED DESCRIPTION

Figure 1:
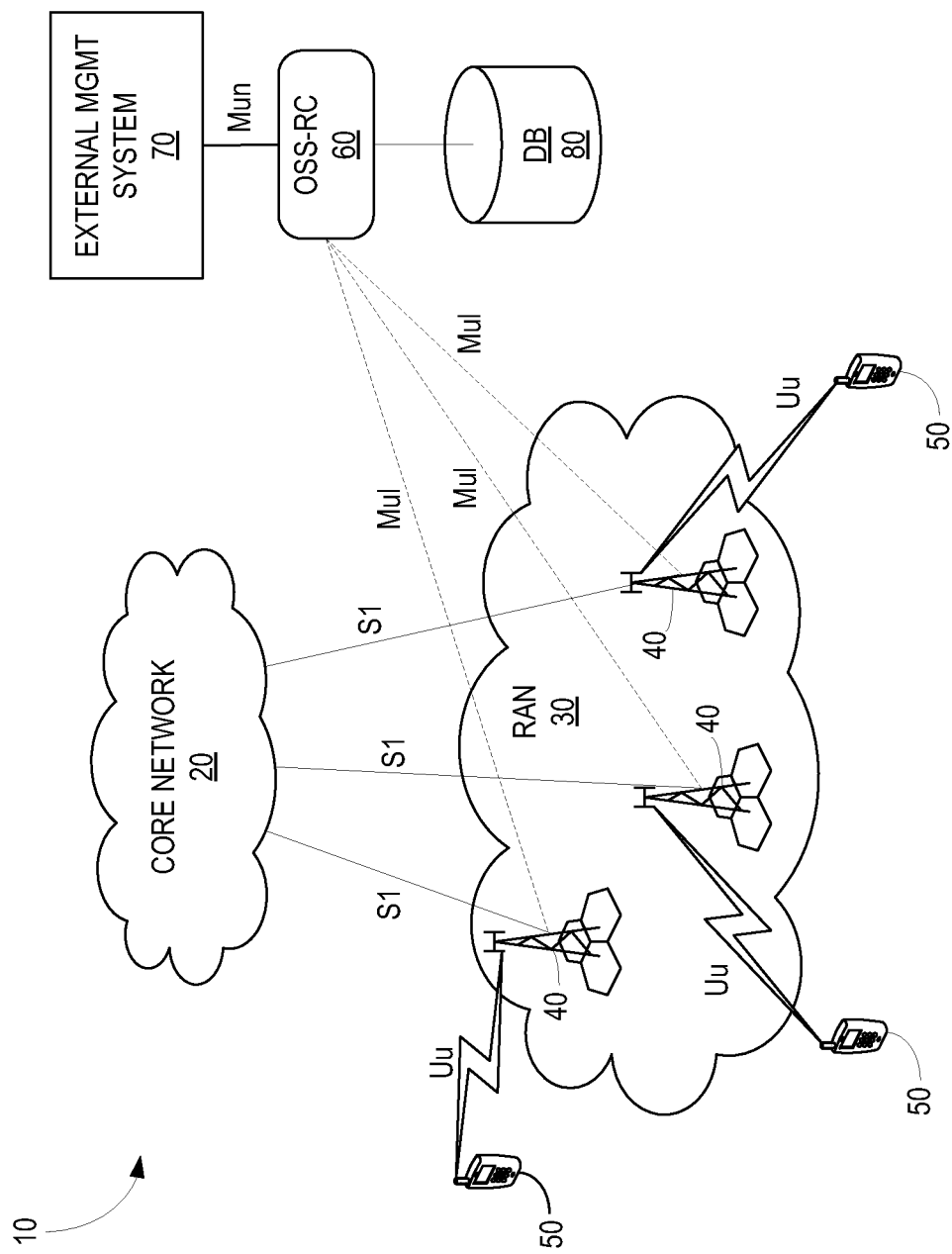
FIG. 1 illustrates an exemplary wireless communication network according to one embodiment.

Referring now to the drawings, FIG. 1 illustrates an exemplary wireless communication network 10 configured according to the Long Term Evolution (LTE) standard. Those skilled in the art will appreciate, however, that particular embodiments of the invention described herein may also be applicable to wireless communication networks based on other standards, such as Wideband Code Division Multiple Access (WCDMA) networks, Worldwide Interoperability for Microwave Access (WiMAX) networks, and wireless local area networks (WLANs).

The exemplary LTE wireless communication network 10 comprises a core network 20 and a radio access network (RAN) 30. The RAN 30 comprises a plurality of base stations 40, which are known as evolved NodeBs (eNBs), that provide service in respective cells. A base station 40 may serve one or more cells. The base stations 40 communicate with user terminals 50 within their respective cells. The user terminals 50 are also referred to as user equipments (UEs). The base stations 40 communicate with the core network 20 over the S1 interface, and communicate with the user terminals 50 over the Uu interface.

The base stations 40 communicate with an Operations Support System –Radio Core (OSS-RC) 60. The OSS-RC 60 provides a centralized configuration and maintenance interface for the base stations 40 in the radio access network 30. The OSS-RC 60 connects over the Mun interface to an external management system 70, which is used by system administrations for configuration, maintenance, and management of the wireless communication network 10. The OSS-RC 60 connects over the Mul interface to the base stations 40.

As will be hereinafter described in greater detail, the OSS-RC 60 maintains a database 80, referred to herein as the retransmission database, that stores information relating to the rate of retransmissions by the user terminals 50. The OSS-RC 60 may function as a database server to provide the retransmission rates of the user terminals 50 and other related information to the base stations 40. When a new user terminal 50 is scheduled, the base station 40 may obtain the retransmission rate and other related information for the user terminal 50 from the OSS-RC 60. This information may be used by the base stations 40 to improve scheduling performance.

In LTE systems, the base stations 40 transmit data to the user terminals 50 over a downlink transport channel known as the Physical Downlink Shared Channel (PDSCH). The PDSCH is a time and frequency multiplexed channel shared by a plurality of user terminals 50. During each one millisecond subframe interval, the base station 40 schedules one or more user terminals 50 based on channel quality indication (CQI) reports from the user terminals 50. The CQI reports indicate the instantaneous channel conditions as seen by the receivers at the user terminals 50. The base station 40 also uses the CQI reports from the user terminals 50 to determine which user terminals 50 to schedule in a given scheduling interval. The base station 40 also uses the CQI reports to select the modulation and coding scheme (MCS) and transport block size (TBS) for downlink transmissions to the user terminal 50.

LTE defines a mapping between the CQI reported by the user terminal 50 and the MCS used by the scheduler at the base station 40. The mapping of the CQI values to corresponding MCS values is shown in Table 1 below.

TABLE 1

| CQI to MCS Mapping | | |
|---|---|---|
| CQI Index | MCS | Modulation |
| 0 | 0 to 9 | No transmission |
| 1 | | QPSK |
| 2 | | QPSK |
| 3 | | QPSK |
| 4 | | QPSK |
| 5 | | QPSK |
| 6 | | QPSK |
| 7 | 10 to 16 | 16QAM |
| 8 | | 16QAM |
| 9 | | 16QAM |
| 10 | 17 to 28 | 64QAM |
| 11 | | 64QAM |
| 12 | | 64QAM |
| 13 | | 64QAM |
| 14 | | 64QAM |
| 15 | | 64QAM |

The MCS is further mapped to the TBS as shown in Table 2 below. The maximum TBS depends on the amount of data in the scheduler and the capability of the user terminal 50.

TABLE 2

| MCS to TBS Mapping | | |
|---|---|---|
| MCS Index | Modulation Order | TBS Index |
| 0 | 2 | 0 |
| 1 | 2 | 1 |

TABLE 2-continued

MCS to TBS Mapping

| MCS Index | Modulation Order | TBS Index |
|---|---|---|
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

The implementation of CQI reporting is not defined in the LTE standard and is therefore dependent on vendor implementation. It has been observed that some variation exists in the CQIs reported by different user terminals 50 under similar conditions. Some vendors may choose to configure the user terminals 50 to report CQI values higher than the actual CQI so that the scheduler at the base station 40 will assign a higher TBS to the user terminals 50 and thus obtain higher throughput for that user terminal 50. However, reporting CQI values higher than actual will result in higher retransmission rates and lower system throughput. Similarly, non-calibrated handsets, i.e., rogue handsets, may also report CQI values higher than actual CQI with the same result.

According to particular embodiments of the present invention, methods and apparatuses are provided for selecting transmission parameters for user terminals that consistently report overly high CQI values so as to reduce the number of retransmissions. In exemplary embodiments of the present invention, the OSS-RC 60, or other node within the wireless communication network 10, maintains a retransmission database 80 that maintains records regarding the retransmission rates of the user terminals 50 served by the base stations 40. A separate record is maintained for each user terminal 50, which is identified by its International Mobile Subscriber Identity (IMSI). Table 3 below illustrates one exemplary structure of a retransmission database 80 maintained by the OSS-RC 60.

TABLE 3

Exemplary Structure of Retransmission Database

| IMSI | CQI | MCS | TBS | Modulation | No. of Active Users | NACK Rate |
|---|---|---|---|---|---|---|

In this example, the information stored in the retransmission database 80 for each user terminal 50 includes the IMSI, CQI, MCS, TBS, modulation, number of active users, and retransmission rate (which is denominated as the NACK rate). The OSS-RC 60 compiles retransmission data reported by the base stations 40 and computes, for example, a 7-day rolling average of the retransmission rates for each user terminal 50. In some embodiments, the OSS-RC 60 may compute and store a single retransmission rate for each user terminal 50 for all possible CQI values. In other embodiments, the OSS-RC 60 may compute and store a separate retransmission rate for each user terminal 50 for each possible CQI value. As will be explained below, the historical retransmission rate data stored in the retransmission database 80 may be used by the scheduler at a base station 40 to improve scheduling performance.

Figure 2:
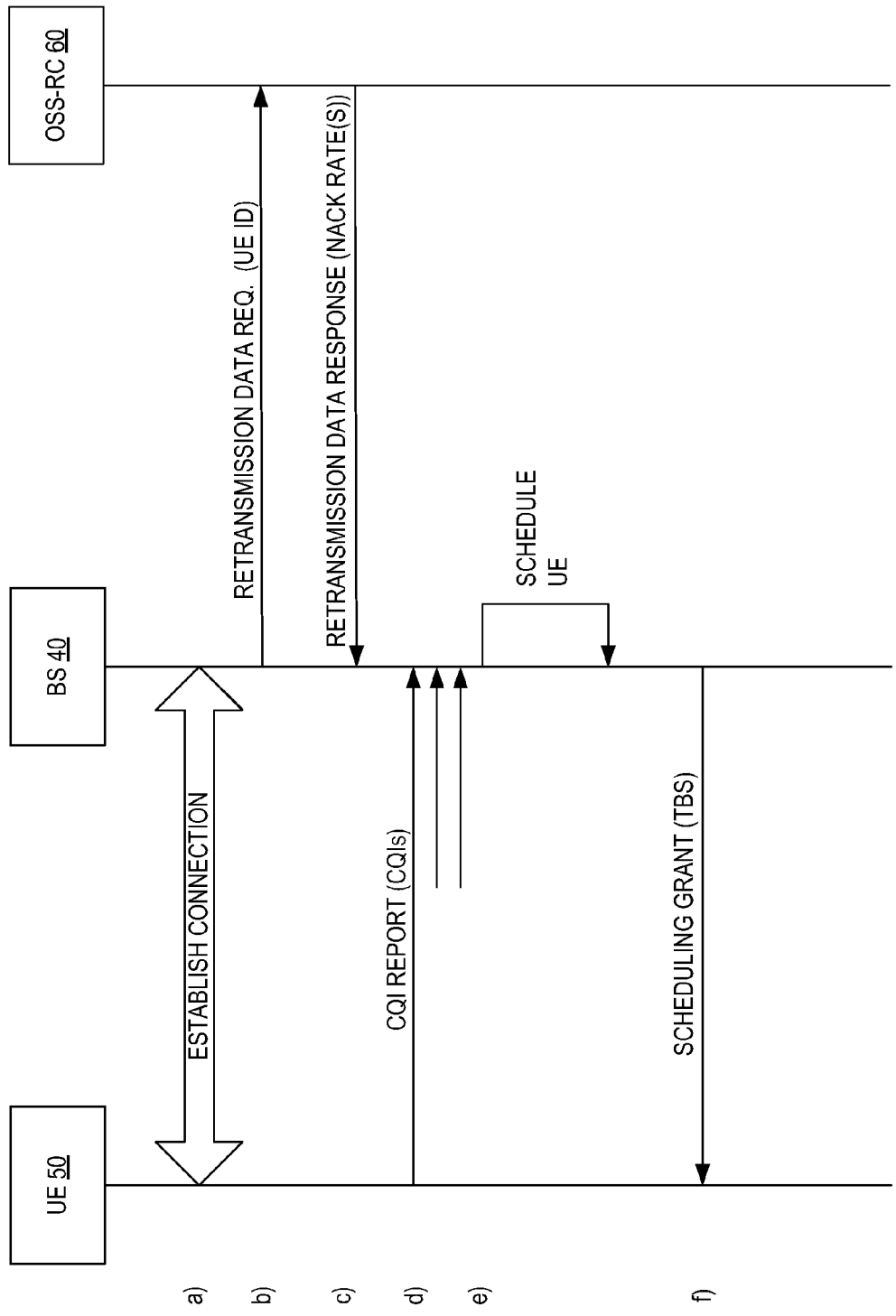
FIG. 2 illustrates signaling procedures related to scheduling of downlink transmissions.

FIG. 2 illustrates exemplary signaling procedures related to downlink scheduling. A user terminal 50 establishes a connection with a base station 40 (step a). When the connection is established, the base station 40 sends a retransmission data request to the OSS-RC 60 (step b). The retransmission data request includes a user terminal identity, such as the IMSI assigned to the user terminal 50. In response to the retransmission data request, the OSS-RC 60 sends a retransmission data response to the base station 40 (step c). The retransmission data response includes the retransmission rate (also referred to as the NACK rate) for the user terminal 50 identified in the request. In some embodiments, a single NACK rate may be reported for the user terminal covering the range of possible CQI values. In other embodiments, separate NACK rates for separate CQI values may be returned to the base station 40.

After establishing a connection with the base station 40, the user terminal 50 sends periodic CQI reports to the base station 40 (step d). The CQI reports include one or more CQI values. In a MIMO system, for example, the CQI report may include a separate CQI value for each pair of transmit and receive antennas. Based on the reported CQI values, the base station 40 schedules a downlink transmission to the user terminal 50 (step e) and sends a scheduling grant to the user terminal 50 (step f) that includes the TBS.

Figure 3:
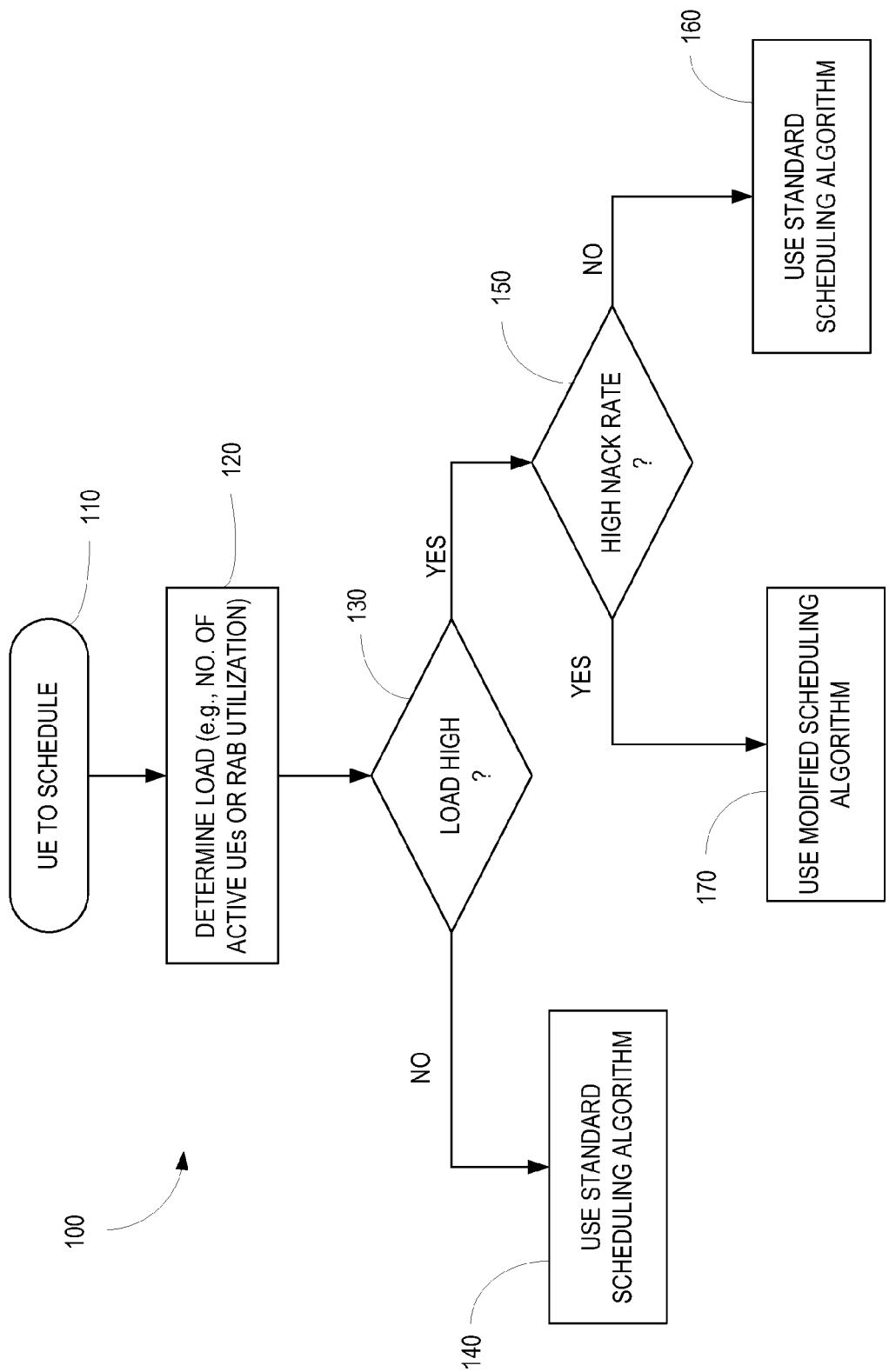
FIG. 3 illustrates an exemplary scheduling procedure implemented by a base station.

FIG. 3 illustrates an exemplary method 100 implemented by the base station 40 for scheduling a user terminal 50. When the base station 40 determines that a user terminal 50 needs to be scheduled on the PDSCH (block 110), the base station 40 determines the current load on the base station (block 120). The current load may be measured in a number of different ways. For example, the load may be determined as the number of active user terminals 50 or the radio access bearer (RAB) utilization. The load may also be determined based on interference levels or rise over thermal (ROT) measurements. Once the current load is determined, the base station 40 compares the current load to a configurable load threshold and determines whether the load is high or low (block 130) (e.g., whether the load is higher or lower than the configurable load threshold). If the current load is low, the base station 40 uses a standard scheduling algorithm to schedule the user terminal 50 based on the reported CQI, QoS, amount of data to be transmitted, and possibly other criteria (block 140). In this case, the retransmission rate of the user terminal 50 is not considered by the scheduling algorithm.

If, at block 130, the base station 40 determines that the load is high, the base station 40 considers the retransmission rate (e.g., a NACK rate) of the user terminal 50 to perform scheduling. In the exemplary embodiment shown in FIG. 3, the base station 40 compares the NACK rate to a configurable NACK rate threshold (block 150). For example, the base station 40 may set the NACK rate threshold equal to the 90th percentile for all user terminals 50. The threshold value may be determined by the OSS-RC 60 and transmitted from the OSS-RC 60 to the base station 40. If the base station 40 determines that the NACK rate is lower than the threshold, the base station 40 uses the standard scheduling algorithm to schedule the user terminal 50 (block 160). If, on the other hand, the NACK rate is above the threshold, the base station 40 uses a modified scheduling algorithm to schedule the user terminal 50 (block 170). In one exemplary embodiment, the scheduler 50 maps the reported CQI value to a range of possible MCS and/or TBS values as shown in Tables 1 and 2. If the retransmission rate of the user terminal is high (e.g., if the retransmission rate is higher than the relevant retransmission threshold), the base station 40 may select the lowest TBS value from the range of possible TBS values.

In the embodiment shown in FIG. 3, the retransmission rate of the user terminal 50 is compared to a single NACK rate threshold. In other embodiments of the invention, two or more NACK rate thresholds may be used to define one or more retransmission rate levels between high and low. The base station 40 may then select the TBS for the downlink transmission based on which retransmission rate level the user terminal 50 falls within.

Figure 4:
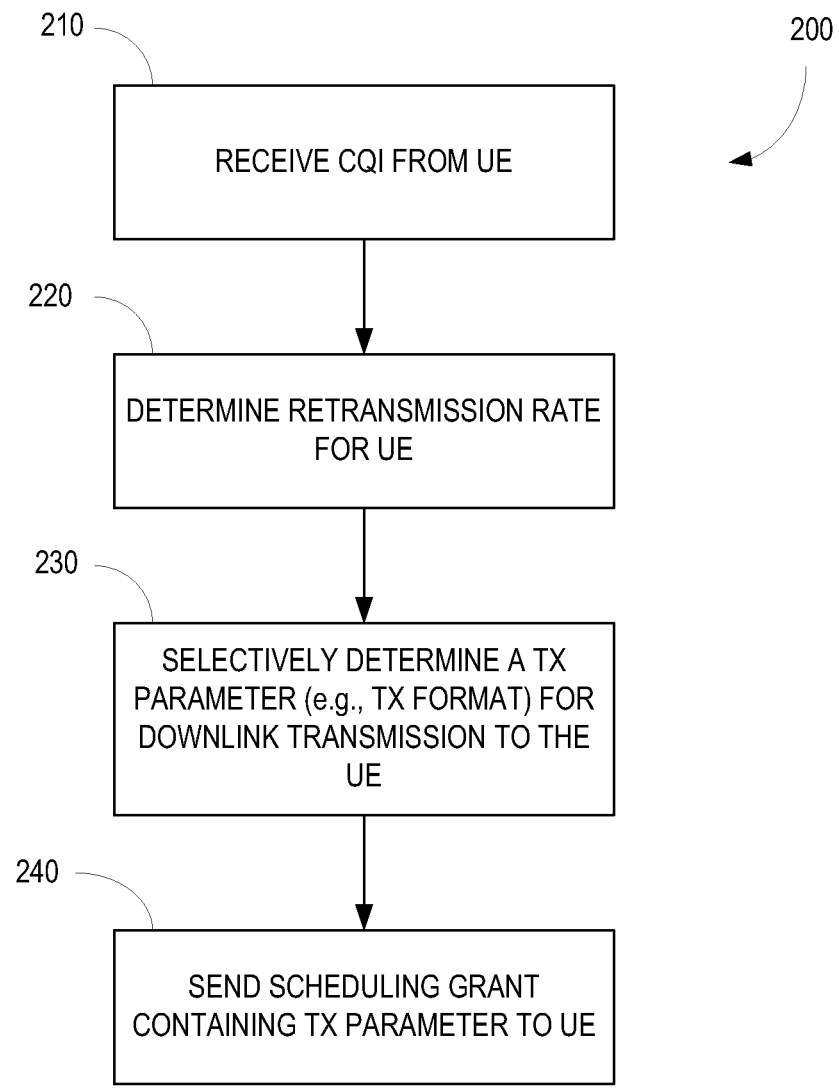
FIG. 4 illustrates an exemplary method implemented by a base station for scheduling a downlink transmission to a user terminal.

FIG. 4 illustrates an exemplary method 200 implemented in a base station 40 when the modified scheduling algorithm is selected, e.g., when the current load exceeds a defined threshold causing the load to be considered "high." The base station receives a CQI from the user terminal 50 (block 210). The CQI is indicative of the channel condition between the base station 40 and the user terminal 50. The base station 40 also determines the retransmission rate for the user terminal 50 (block 220). The retransmission rate determined in block 220 may be a general retransmission rate that is used for all possible CQI values, or a specific retransmission rate for the reported CQI values. Based at least in part on the CQI and retransmission rate, the base station 40 selectively determines a transmission parameter, e.g., MCS and/or TBS, for a scheduled downlink transmission to the user terminal 50 (block 230). After the transmission parameter is determined, the base station 40 sends a scheduling grant containing the transmission parameter to the user terminal (block 240).

Figure 5:
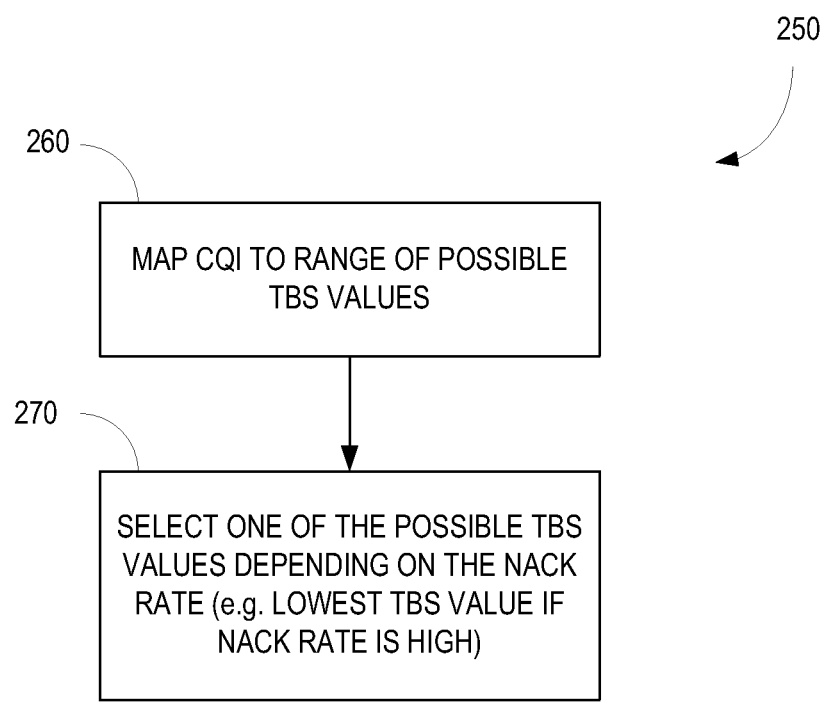
FIG. 5 illustrates an exemplary method implemented by a base station for selecting transmission parameters for a downlink transmission to a user terminal.

FIG. 5 Illustrates an exemplary method 250 implemented by base station 40 for determining the transmission parameters for a user terminal 50 being scheduled. This method 250 may be performed at block 230 in FIG. 4. In this embodiment, the base station 40 maps the reported CQI to a range of possible MCS and/or TBS values (block 260). The base station 40 then selects one of the corresponding TBS values depending on the retransmission rate (block 270). For example, the base station 40 may select the lowest TBS values in the range of corresponding values if the retransmission rate is high.

Allowing the base station 40 to use a modified scheduling algorithm when the current load is high to take into account the retransmission rate of the user terminal 50 allows for more efficient use of the radio resources. When the current load is low, less than all of the radio resources may be in use. Therefore, if a user terminal 50 reports a CQI higher than the actual CQI, resources are likely to be available for the retransmission. Thus, the retransmission in such a scenario is unlikely to impact other users. On the other hand, when the current load on the base station is high, more of the radio resources will be in use so that allocation of those resources to a retransmission consumes resources that could be used for other transmission. The scheduling algorithm can select transmission parameters for user terminals 50 that report overly high CQIs to reduce the number of retransmissions. In effect, the base station 40 assigns lower data rates to user terminals 50 that consistently report overly high CQIs, while giving higher data rates to other user terminals 50.

Figure 6:
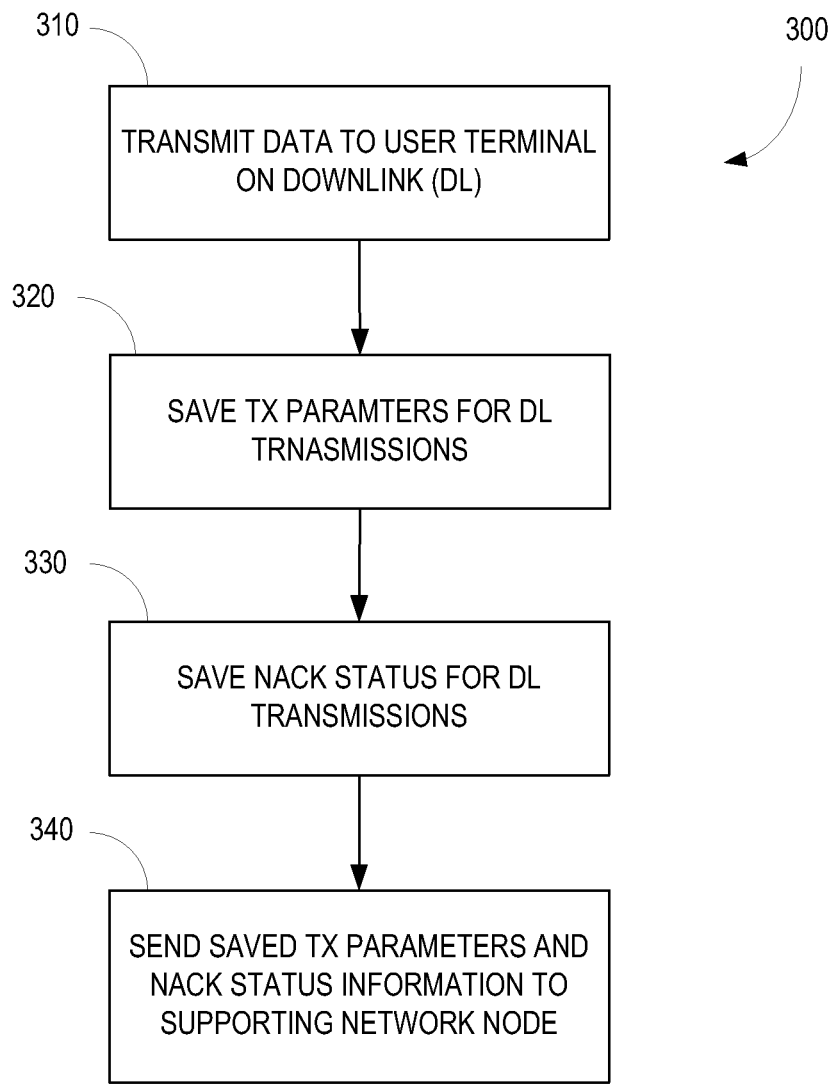
FIG. 6 illustrates an exemplary method of collecting retransmission data and reporting the retransmission data to a supporting network node.

FIG. 6 Illustrates an exemplary data collection method 300 implemented by a base station 40 for collecting retransmission data. The base station 40 transmits data to the user terminal 40 on the PDSCH (block 310). For each transmission, the base station 40 saves the CQI reported by the user terminal 50 and the relevant transmission parameters, e.g. MCS and/or TBS (block 320). The base station 40 may also save the number of active user terminals, the RAB utilization or other information related to the current load. For each transmission, the base station 40 saves whether the user terminal 50 requested a retransmission, e.g., the NACK status (block 330). The collected data is periodically reported to the OSS-RC 60 (block 340). In some embodiments, the OSS-RC 60 may also request an upload of the retransmission data from the base station 40.

FIG. 7 illustrates an exemplary method 400 implemented by a supporting network node, e.g., OSS-RC 60, for providing information to base stations 40 about the retransmission rates of the user terminals 50 served by the base stations 40. The supporting network node 60 maintains a retransmission database containing the retransmission rates for user terminals 50 served by a wireless communication network 10 (block 410). In one exemplary embodiment, the supporting network node computes and stores a single retransmission rate for all possible CQI values for each user terminal 50. In other embodiments, the supporting network node computes and stores separate retransmission rates for different CQI values for each user terminal 50. From time to time, the supporting network node receives a retransmission data request from a base station 40 (block 420). In response to the retransmission data request, the supporting network node sends a retransmission data response to the requesting base station 40 (block 430). The retransmission data response contains the retransmission rate or rates for the user terminal 50 or user terminals 50 identified in the request.

FIG. 8 illustrates an exemplary method 500 implemented by a supporting network node in a wireless communication network 10 for maintaining a retransmission database. The supporting network node from time to time, e.g. periodically, receives an update message from a base station 40 in the wireless communication network 10 (block 510). The update message includes retransmission data collected by the base station 40 since its last update message. The update message includes one or more records relating to downlink transmissions. In one embodiment, each record includes the IMSI of the user terminal 50 receiving the downlink transmission, the transmission parameters, e.g. MCS and/or TBS, for the downlink transmission, and the NACK status for the downlink transmission. The update message may also include, for each record, the number of active user terminals or RAB utilization at the time of the downlink transmission. After receiving the update message, the supporting network node updates the retransmission database to reflect the information in the update message (block 520). For example, the supporting network node may recompute the retransmission rates for one or more user terminals and store the revised retransmission rates in the retransmission database.

Figure 9:
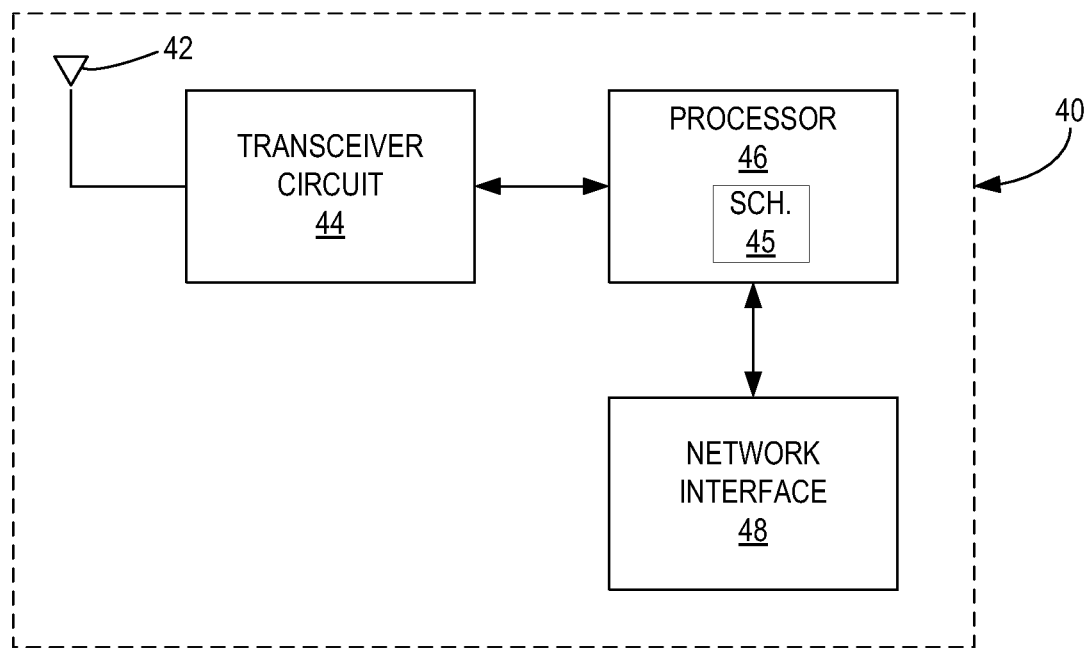
FIG. 9 illustrates the main functional components of an exemplary base station.

FIG. 9 illustrates the main components of an exemplary base station 40 according to one embodiment. The base station 40 comprises a transceiver circuit 44, a processor 46, and a network interface 48. The transceiver circuit 44 couples to one or more antennas 42 and is used to transmit data to and receive data from the user terminals 50 served by the base station 40. The transceiver circuit 44 may operate according to the LTE, WCDMA, WiMAX, WLAN or other wireless communication standards, for example. The processor 46 controls the operation of the base station 40 and processes signals transmitted and received by the base station 40. Such processing typically includes modulation, demodulation, coding, and decoding. The processor 46 includes a scheduler 45 for scheduling downlink transmissions to the user terminals 50 as herein described. The processor 46 may be implemented by one or more microprocessors, microcontrollers, hardware, firmware, or a combination therefore. In particular embodiments, the processor 46 may represent electronic circuitry configured to execute computer instructions stored in a non-transitory, computer-readable medium, such as a local memory element (e.g., random access memory (RAM) or read-only memory (ROM)) or a removable storage medium (e.g., a digital video disc (DVD), compact disc (CD), or flash memory device). The network interface 48 enables the base station 40 to communication with other nodes within the wireless communication network 10, including core network nodes, other base stations, and other supporting network nodes, such as the OSS-RC 60.

Figure 10:
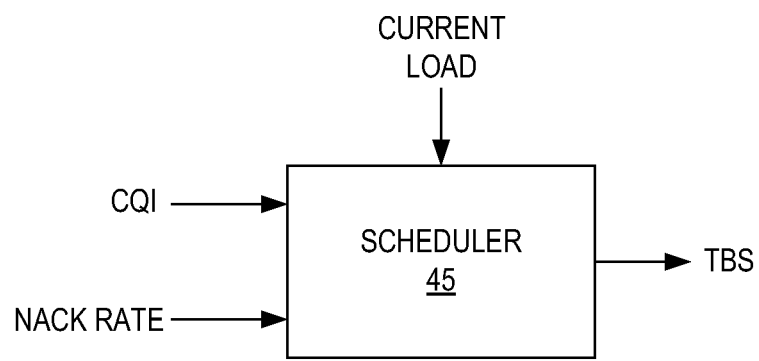
FIG. 10 is a schematic illustration of the scheduler at a base station.

FIG. 10 schematically illustrates a scheduler 45 at a base station 40. The scheduler 45 operates as herein described to schedule downlink transmission to user terminals 50 served by the base station 40. To perform scheduling, the scheduler receives the CQI and retransmission rate for a user terminal 50 being scheduled, and the current load at the base station 40. Based on these inputs, the scheduler 45 schedules a downlink transmission for the user terminal 50 and selects a transmission parameter, e.g., TBS, for the downlink transmission as illustrated in FIGS. 2-5.

Figure 11:
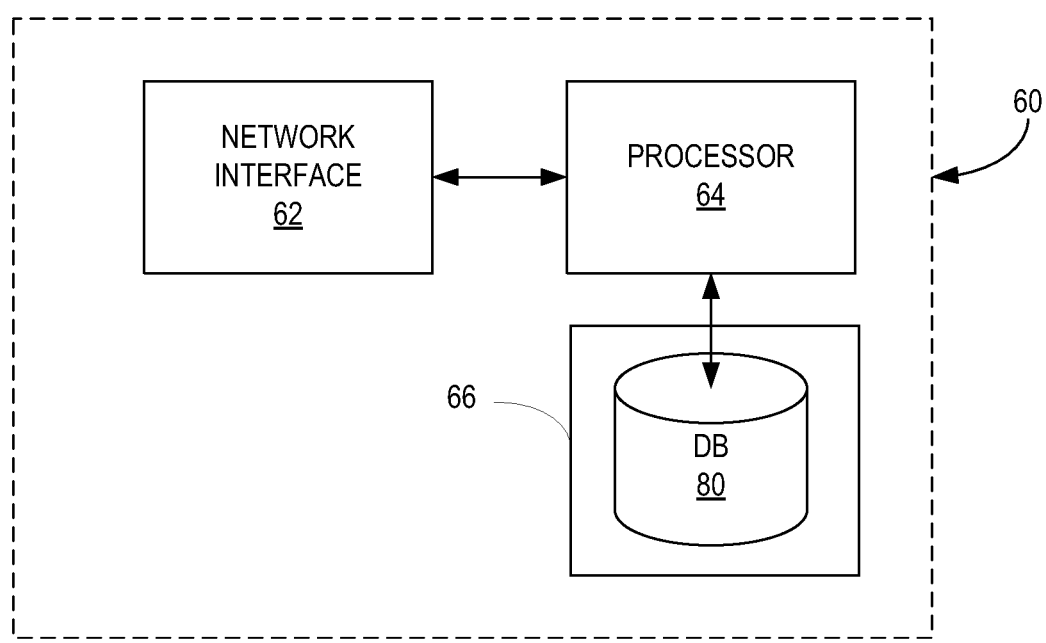
FIG. 11 illustrates the main functional components of supporting node in a wireless communication network for maintaining a retransmission database.

FIG. 11 illustrates the main functional components of a supporting network node (e.g., OSS-RC 60) for maintaining a retransmission database 80. The supporting network node comprises a network interface 62 for communicating with the base stations 40 and other network nodes in the wireless communication network, and a processor 64 for controlling the network node 60 and performing necessary processing functions. In one exemplary embodiment, the processor 64 is configured to perform database server functions to respond to requests from user terminals 50. The processor 64 may be implemented by one or more microprocessors, microcontrollers, hardware, firmware, or a combination therefore. In some embodiments, the supporting network node may also include memory 66 for storing the retransmission database 80. Alternatively, the retransmission database 80 may be stored externally. Additionally, in particular embodiments, the processor 64 may represent electronic circuitry configured to execute computer instructions stored in a non-transitory, computer-readable medium, such as a local memory element (e.g., memory 66) or a removable storage medium (e.g., a digital video disc (DVD), compact disc (CD), or flash memory device).

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method implemented by a base station in a wireless communication network of scheduling a downlink transmission on a downlink shared channel to a user terminal, said method comprising:
   receiving a channel quality indication from the user terminal indicative of a channel condition between the base station and the user terminal;
   determining a retransmission rate for the user terminal;
   selectively determining a transmission parameter for scheduling the downlink transmission on the downlink shared channel to the user terminal, wherein selectively determining the transmission parameter further includes:
   determining a current load at the base station;
   in response to determining that the current load is at least a predetermined load threshold, determining whether the retransmission rate of the user terminal is at least a predetermined retransmission rate threshold; and
   in response to determining that the retransmission rate is at least the predetermined retransmission rate threshold, mapping the channel quality indication to a range of values associated with a transport block size and selecting one of the values in the range associated with a lowest transport block size, wherein the transport block size is associated with the transmission parameter; and
   sending a scheduling grant containing the transmission parameter to the user terminal.

2. The method of claim 1 wherein selectively determining the transmission parameter for scheduling the transmission comprises:
   determining the transmission parameter for the downlink transmission based on the channel quality indication and the retransmission rate if the retransmission rate is high; and
   otherwise determining the transmission parameter for the downlink transmission based on the channel quality indication.

3. The method of claim 2 wherein determining the current load at the base station comprises determining a number of currently active user terminals.

4. The method of claim 2 wherein determining the current load at the base station comprises determining a utilization of available radio access bearers.

5. The method of claim 1 wherein selectively determining the transmission parameter further includes selecting a transport format for the user terminal depending on the channel quality indication and the retransmission rate.

6. The method of claim 5 wherein selecting the transport format for the user terminal comprises:
   mapping the channel quality indication to a range of possible values for the transport format; and
   selecting one of said possible values in said range depending on the retransmission rate.

7. The method of claim 6 wherein selecting one of said possible values in said range depending on the retransmission rate comprises selecting a lowest possible value for the transport format for the downlink transmission if the retransmission rate for the user terminal is high.

8. A base station in a wireless communication network, said base station comprising:
   a transceiver circuit for communicating with a user terminal; and
   a processor operatively connected to a memory and said transceiver circuit for scheduling a downlink transmission to said user terminal, said processor and the memory comprising a scheduler configured to:
   receive a channel quality indication from the user terminal indicative of the channel condition between the base station and the user terminal;
   determine a retransmission rate for the user terminal;
   selectively determine a transmission parameter for scheduling the downlink transmission on a downlink shared channel to the user terminal, wherein selectively determining the transmission parameter includes the scheduler being further configured to:
   determine a current load at the base station;

in response to determining that the current load is at least a predetermined load threshold, determine whether the retransmission rate of the user terminal is at least a predetermined retransmission rate threshold; and in response to determining that the retransmission rate is at least the predetermined retransmission rate threshold, map the channel quality indication to a range of values associated with a transport block size and select one of the values in the range associated with a lowest transport block size, wherein the transport block size is associated with the transmission parameter; and send a scheduling grant containing the transmission parameter to the user terminal.

9. The base station of claim 8 wherein selectively determining the transmission parameter includes the scheduler being further configured to:

determine the transmission parameter for the downlink transmission based on the channel quality indication and the retransmission rate if the retransmission rate is high; and otherwise determine the transmission parameter for the downlink transmission based on the channel quality indication.

10. The base station of claim 8 wherein determining the current load at the base station includes the scheduler being further configured to determine a number of currently active user terminals.

11. The method of claim 8 wherein determining the current load at the base station includes the scheduler being further configured to determine a utilization of available radio access bearers.

12. The base station of claim 8 wherein selectively determining the transmission parameter includes the scheduler being further configured to select a transport format for the user terminal depending on the channel quality indication and the retransmission rate.

13. The base station of claim 12 wherein selecting the transport format for the user terminal includes the scheduler being further configured to:

map the channel quality indication to a range of possible values for the transport format; and select one of said possible values in said range depending on the retransmission rate.

14. The base station of claim 13 wherein selecting one of said possible values in said range depending on the retransmission rate includes the scheduler being further configured to select a lowest possible value for the transport format for the downlink transmission if the retransmission rate for the user terminal is high.

15. The method of claim 1, wherein determining the retransmission rate for the user terminal includes:

sending, by the base station, to a network node, a request for the retransmission rate of the user terminal; and in response to the request, receiving, by the base station, from the network node, the retransmission rate of the user terminal.

16. The method of claim 1, wherein selectively determining the transmission parameter includes:

if the current load is at least a predetermined load threshold, then:

if the retransmission rate is at least a predetermined retransmission rate threshold, then mapping the channel quality indication to a range of values associated with a transport block size and selecting one of the values in the range associated with a lowest transport block size; and if the retransmission rate is less than the predetermined retransmission rate threshold, then selecting the transport block size associated with the channel quality indication; and if the current load is less than the predetermined load threshold, then selecting the transport block size associated with the channel quality indication.

17. The method of claim 1, wherein selectively determining the transmission parameter includes:

selecting the transport block size from a range of transport block sizes corresponding to a certain modulation technique based on the channel quality indication and the retransmission rate.

18. The method of claim 17, wherein selecting the transport block size includes selecting one of the values in the range of transport block sizes associated with a lowest transport block size.

* * * * *

UNITED STATES PATENT AND TRADEMARK OFFICE
CERTIFICATE OF CORRECTION

PATENT NO.        : 9,144,080 B2                                           Page 1 of 1
APPLICATION NO.   : 13/670660
DATED             : September 22, 2015
INVENTOR(S)       : Sarkar et al.

It is certified that error appears in the above-identified patent and that said Letters Patent is hereby corrected as shown below:

On the Title Page, in Item (74), under "Attorney, Agent, or Firm", in Column 2, Line 1, delete "Coats & Bonnett, PLLC" and insert -- Coats & Bennett, PLLC --, therefor.

In The Claims

In Column 11, Line 30, in Claim 11, delete "The method of claim" and insert -- The base station of claim --, therefor.

Signed and Sealed this
Eighth Day of March, 2016

Michelle K. Lee
*Director of the United States Patent and Trademark Office*